(12) United States Patent
Ogura et al.

(10) Patent No.: US 12,335,271 B2
(45) Date of Patent: Jun. 17, 2025

(54) SYSTEM, METHOD AND PROGRAM FOR AN INDUSTRIAL CONTROL SYSTEM HAVING ASSETS THAT REQUIRE DIFFERENT AUTHENTICATION AND AUTHORIZATION LEVELS FOR ACCESS

(71) Applicant: Hitachi, Ltd., Tokyo (JP)

(72) Inventors: Takashi Ogura, Tokyo (JP); Junya Fujita, Tokyo (JP); Mitsuaki Ishiba, Tokyo (JP); Toshihiko Nakano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 205 days.

(21) Appl. No.: 18/138,191

(22) Filed: Apr. 24, 2023

(65) Prior Publication Data

US 2023/0403284 A1 Dec. 14, 2023

(30) Foreign Application Priority Data

Jun. 9, 2022 (JP) .................................. 2022-093882

(51) Int. Cl.
*G06F 21/62* (2013.01)
*G06F 21/60* (2013.01)
*H04L 9/40* (2022.01)
*G06F 21/45* (2013.01)
*G06F 21/71* (2013.01)

(52) U.S. Cl.
CPC ........ *H04L 63/105* (2013.01); *H04L 63/0876* (2013.01)

(58) Field of Classification Search
None
See application file for complete search history.

(56) References Cited

U.S. PATENT DOCUMENTS

2012/0266209 A1* 10/2012 Gooding ................. H04L 63/20
726/1
2021/0019434 A1* 1/2021 Bibliowicz .......... G06F 21/6218
2021/0286861 A1* 9/2021 Churchill ................ G06F 21/31
(Continued)

FOREIGN PATENT DOCUMENTS

JP 2008-242641 A 10/2008
JP 2023065713 A * 5/2023

*Primary Examiner* — Venkat Perungavoor
(74) *Attorney, Agent, or Firm* — MATTINGLY & MALUR, PC

(57) ABSTRACT

An authentication and authorization system acquires an authentication and authorization request for requesting authentication and/or authorization when a request source asset requests a request destination asset to perform predetermined processing, analyzes the authentication and authorization request to specify at least one of asset statuses indicating target matters of the authentication and/or authorization for the request source asset and the request destination asset, a request level indicating a degree of confirmation required for the authentication and/or authorization in response to the authentication and authorization request, and a relationship between the request source asset and the request destination asset, and determines the authentication and authorization means to be used for the authentication and/or authorization in response to the authentication and authorization request, based on the specified at least one of the asset statuses, the request level, and the relationship.

8 Claims, 11 Drawing Sheets

(56) References Cited

U.S. PATENT DOCUMENTS

| | | | |
|---|---|---|---|
| 2021/0306348 A1* | 9/2021 | Ratiner | G06F 21/62 |
| 2021/0360034 A1* | 11/2021 | Olden | H04L 63/1408 |
| 2021/0385159 A1* | 12/2021 | Mehmedagic | H04L 63/0218 |
| 2022/0404812 A1* | 12/2022 | Amaro, Jr. | G05B 19/4188 |
| 2023/0401332 A1* | 12/2023 | Vahidnia | G06F 21/31 |
| 2023/0412608 A1* | 12/2023 | Vaishnavi | H04L 63/102 |

* cited by examiner

FIG. 4

| ASSET NAME 410 | AUTHENTICITY 420 | SECURITY 431 | RELIABILITY 430 | | PROTECTIVITY 440 |
| --- | --- | --- | --- | --- | --- |
| | | | QUALITY 432 | RESILIENCE 433 | |
| ROBOT 35 | MANUFACTURING NUMBER INFORMATION: AVAILABLE IP/MAC ADDRESS INFORMATION: AVAILABLE | | MANUFACTURER INFORMATION: UNAVAILABLE (UNKNOWN) DEVELOPMENT SPECIFICATION: AVAILABLE | EXCESS CALCULATION CAPACITY: UNAVAILABLE BACKUP: UNAVAILABLE | DUSTPROOF AND FIRE PREVENTION MEASURES: AVAILABLE DATA ENCRYPTION: UNAVAILABLE |
| ROBOT MANAGEMENT DEVICE 32 | MANUFACTURING NUMBER INFORMATION: AVAILABLE IP/MAC ADDRESS INFORMATION: AVAILABLE | ANTIVIRUS SOFTWARE: AVAILABLE | MANUFACTURER INFORMATION: AVAILABLE (A CORPORATION) DEVELOPMENT SPECIFICATION: AVAILABLE | EXCESS CALCULATION CAPACITY: AVAILABLE BACKUP: AVAILABLE | DUSTPROOF AND FIRE PREVENTION MEASURES: UNAVAILABLE DATA ENCRYPTION: AVAILABLE |
| EXTERNAL SITE 34 | | RESTRICTION OF ENTRY (GATE): AVAILABLE | | | |

| ASSET NAME | EVALUATION VALUE |
|---|---|
| ROBOT 35 | 4 |
| ROBOT MANAGEMENT DEVICE 32 | 7 |
| EXTERNAL SITE 34 | 1 |

810 820

SYSTEM, METHOD AND PROGRAM FOR AN INDUSTRIAL CONTROL SYSTEM HAVING ASSETS THAT REQUIRE DIFFERENT AUTHENTICATION AND AUTHORIZATION LEVELS FOR ACCESS

CROSS-REFERENCE TO RELATED APPLICATION

The present application claims priority from Japanese application JP2022-093882, filed on Jun. 9, 2022, the contents of which is hereby incorporated by reference into this application.

BACKGROUND OF THE INVENTION

1. Field of the Invention

The present invention relates to a technique that performs authentication and authorization.

2. Description of the Related Art

At present, digital transformation (DX) remarkably proceeds also in an industrial control system (ICS). With the progress of the DX, a great number of Internet of Things (IoT) devices are introduced into the ICS, and thus the ICS becomes smart and is made open by utilizing remote connection. As a result, the ICS becomes a system in which assets (machines, computers, software, and human resources) and their relationships are not fixed as in the past, a wide variety of assets are newly introduced, and thus their relationships also become complicated and change by the hour.

On the other hand, cyber security issues become more serious due to the smart and open ICS due to DX. For example, by introducing a great number of IoT devices into the ICS, the system is hacked via the IoT devices, and unauthorized software is installed in each device in the system via a supply chain. Thus, hacking sources of attacks are diversified. Since the ICS is required to operate stably, the availability and safety are regarded as important. Therefore, the DX of the ICS is required to proceed more securely, that is, while dealing with security issues, as compared with the DX in a general field.

Therefore, the important is a security model that performs authentication and/or authorization individually for each asset. In a case of a conventional ICS in which assets and their relationships are fixed, the entire ICS can be protected by appropriately performing authentication and authorization only at a boundary between the ICS and the outside. However, in an ICS adopting the advanced DX, the assets related to the ICS and their relationships are diversified and complicated, and thus, cooperation of information with an ICS and the like frequently occurs in places other than the boundary. For this reason, it is not sufficient to perform authentication and authorization only at the boundary. Therefore, it is necessary to individually authenticate and authorize each asset constituting the ICS in addition to the portion as the boundary between the ICS and the outside.

However, since each asset in the ICS individually has a difference in function and processing capability. Thus, when each asset is individually authenticated and authorized, a method, a content, and a technique that are related to the authentication and authorization have to be determined with sufficient care in order that the authentication and authorization do not hinder the stable operation emphasized in the ICS.

A technique related to this is disclosed in JP 2008-242641 A. In the technique of JP 2008-242641 A, a method for notifying about a result of authentication and authorization can be changed in accordance with a request from a user.

SUMMARY OF THE INVENTION

As described above, as for the authentication and authorization method in JP 2008-242641 A, a method for notifying a user can be changed in accordance with a request from the user. However, this method does not meet the requirements specific to ICS. Here, the requirements specific to the ICS are, for example, not to hinder the stable operation of an installed system and to maintain a real-time property for the stable operation. In addition, a method utilizing a digital certificate technique or an electronic certificate technique, which is an authentication and authorization technique utilized in a general information technology (IT) system, also does not meet the above-described requirements specific to the ICS. On the other hand, when a processing load and a processing time are attempted to be reduced by performing authentication and authorization only with a simple authentication and authorization technique that does not utilize a digital certificate or the like, security might be insufficient.

One object of the present disclosure is to provide a technique that achieves suitable authentication and/or authorization in a target system including various assets.

In order to solve the above issue, an aspect of the present invention provides an authentication and authorization system that acquires an authentication and authorization request for requesting authentication and/or authorization when a request source asset requests a request destination asset to execute predetermined processing, analyzes the authentication and authorization request to specify at least one of asset statuses indicating target matters of the authentication and/or authorization for the request source asset and the request destination asset, a request level indicating a degree of confirmation required for the authentication and/or authorization in response to the authentication and authorization request, and a relationship between the request source asset and the request destination asset, and determines authentication and authorization means to be used for the authentication and/or authorization in response to the authentication and authorization request, based on the specified at least one of the asset statuses, the request level, and the relationship.

According to one aspect of the present invention, it is possible to achieve suitable authentication and/or authorization for each asset in a target system having various assets.

BRIEF DESCRIPTION OF THE DRAWINGS

FIG. 4 illustrates asset status data;

FIG. 8 illustrates an example of asset evaluation value data;

DESCRIPTION OF THE PREFERRED EMBODIMENTS

Figure 3:
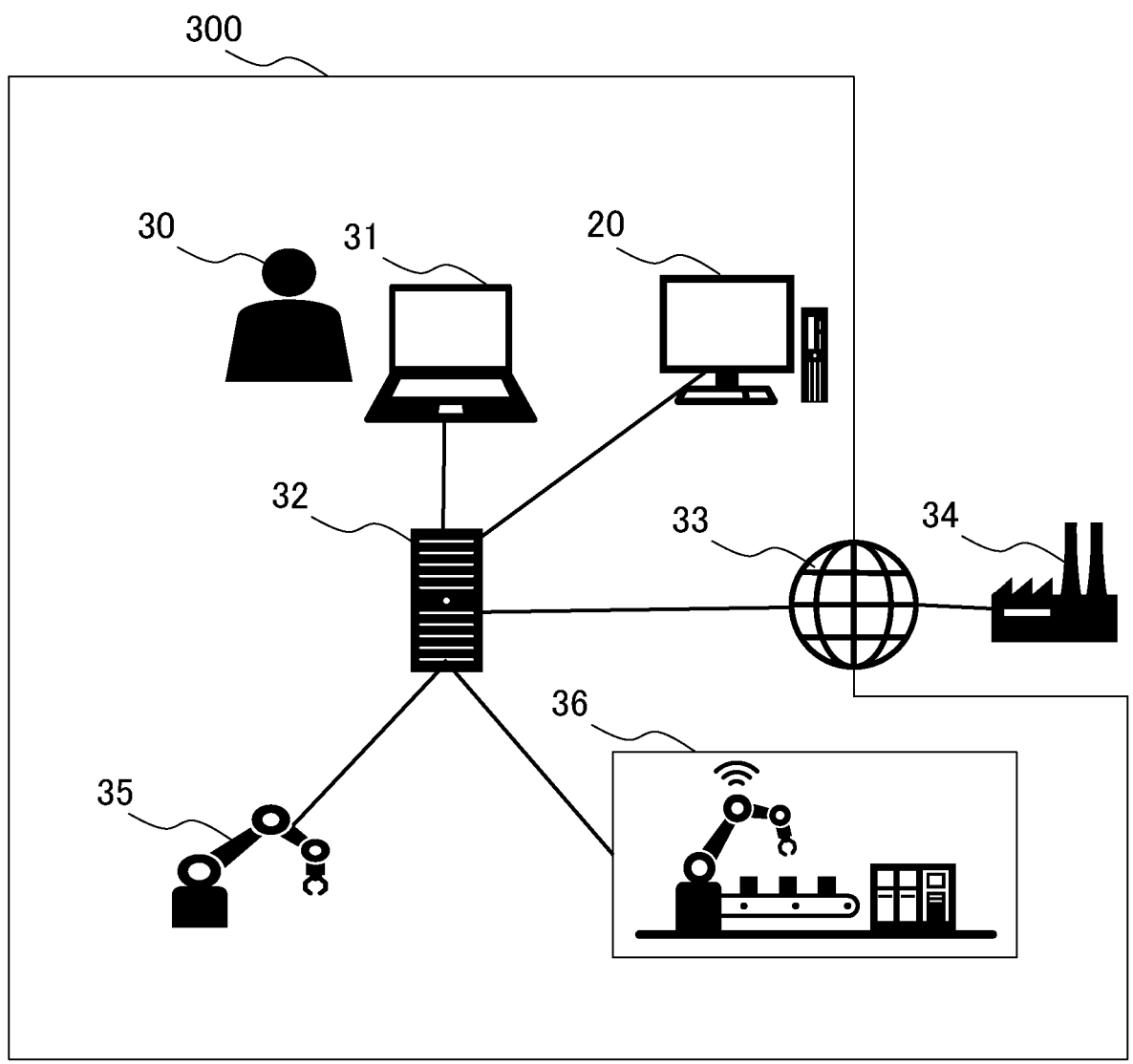
FIG. 3 is a conceptual diagram of a control system according to the first embodiment.

Hereinafter, preferred embodiments of the present invention will be described with reference to the drawings. In each preferred embodiment, authentication and authorization means of a control system to which components illustrated in FIG. 3 are connected is generated. The components include a robot management device 32 and the like, and a specific system configuration will be described later.

First Embodiment

Hereinafter, the first embodiment of the present invention will be described with reference to the drawings.

Figure 1:
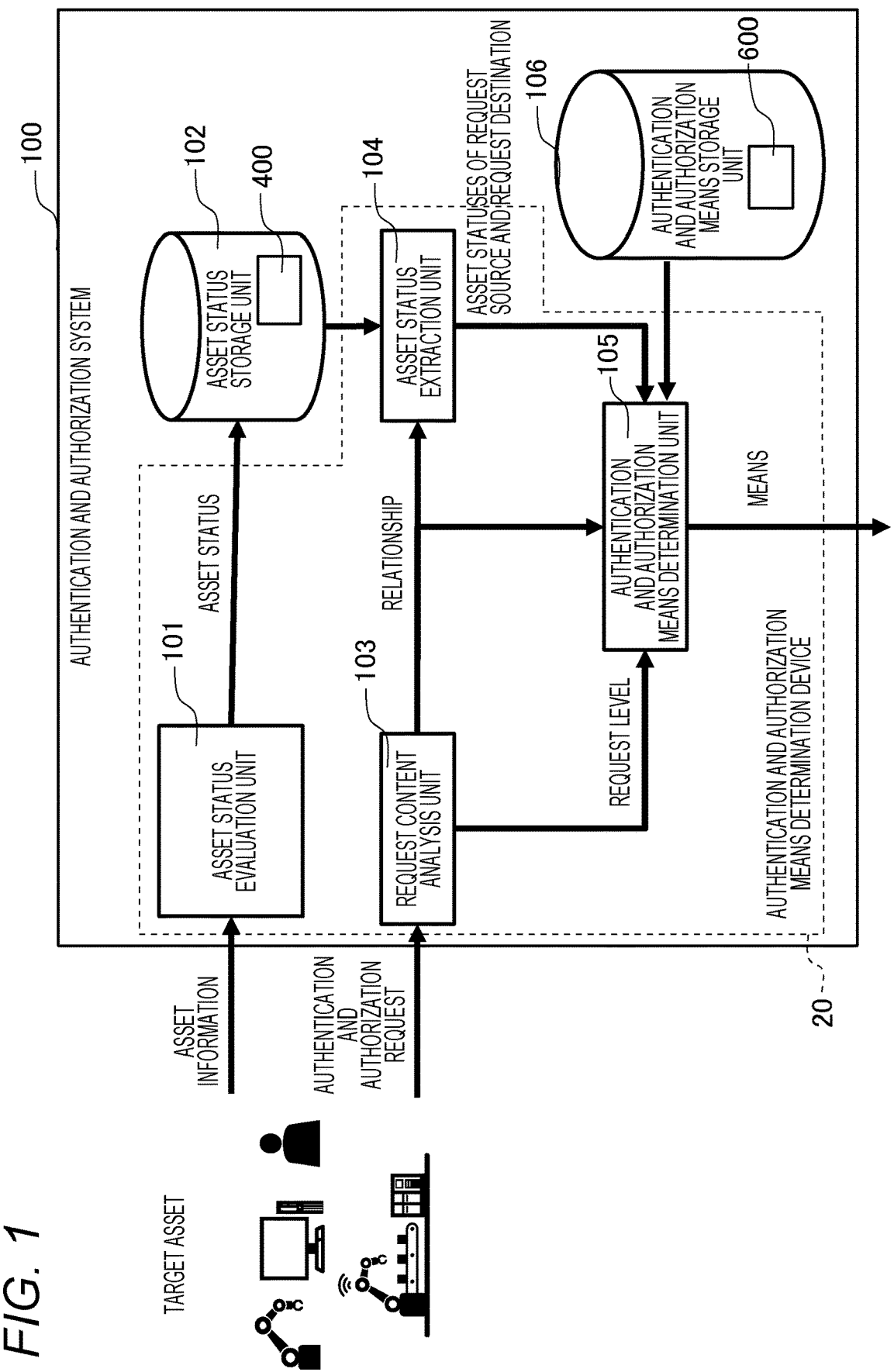
FIG. 1 is a block diagram of an authentication and authorization system according to a first embodiment.

FIG. 1 is a block diagram of an authentication and authorization system according to the first embodiment. An authentication and authorization system 100 includes an authentication and authorization means determination device 20.

Figure 2:
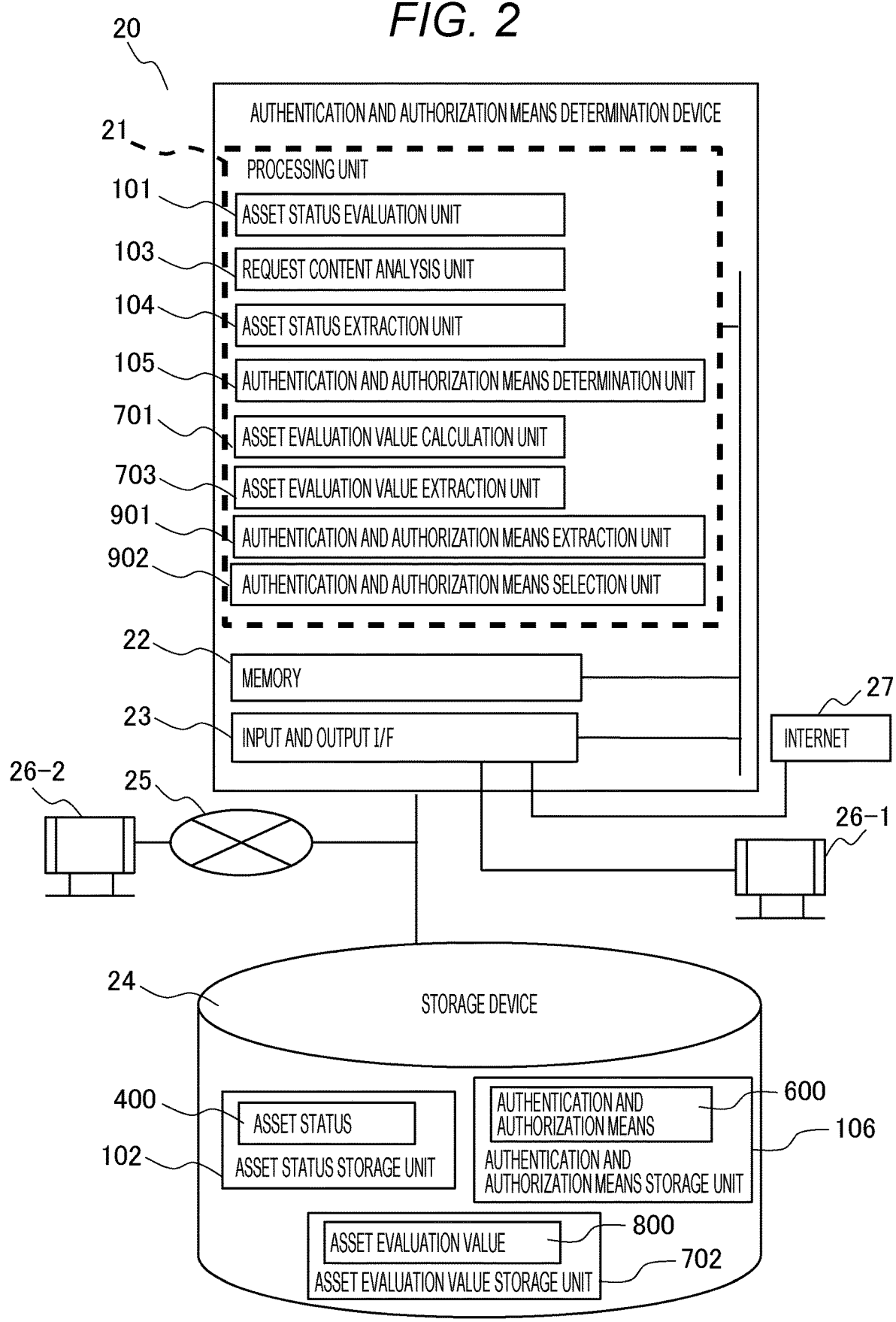
FIG. 2 is a block diagram of a system in which an authentication and authorization means determination device is achieved by a computer.

FIG. 2 is a block diagram of a system in which the authentication and authorization means determination device 20 is achieved by a computer. Note that FIG. 2 is shared by first to fourth embodiments and illustrates a configuration including the authentication and authorization means determination device 20 according to the first to fourth embodiments.

The authentication and authorization means determination device 20 is a device that determines means to be used for individually performing authentication and/or authorization on a target asset to be authenticated and/or authorized (hereinafter also referred to as "authentication and authorization means"). The target asset is an asset subject to authentication and/or authorization. The authentication and authorization means includes an authentication and/or authorization method. Examples of the authentication and/or authorization method include a method using an electronic certificate and a method without using an electronic certificate.

With reference to FIGS. 1 and 2, the authentication and authorization means determination device 20 according to the first embodiment includes an asset status evaluation unit 101, a request content analysis unit 103, an asset status extraction unit 104, and an authentication and authorization means determination unit 105. The authentication and authorization system 100 includes an asset status storage unit 102 and an authentication and authorization means storage unit 106.

Each block (function) will be described below.

In the present embodiment, the control system is a target system to be subjected to asset authentication and/or authorization. The target system is, for example, an industrial control system (ICS) that are related to various assets such as a machine, computer hardware, and software. These assets are assets to be subject to the authentication and/or authorization, that is, target assets.

The asset status storage unit 102 stores asset status data 400. The asset status data 400 includes an asset status of each asset. Each asset status indicates a matter to be confirmed in the authentication and/or authorization.

The asset status evaluation unit 101 receives information (asset information) regarding the assets related to the control system in advance, and evaluates the asset statuses based on the received asset information. The evaluation of the asset statuses is to specify the asset statuses of the assets. The specified asset status of each asset is recorded as the asset status data 400.

The request content analysis unit 103 analyzes a content of the request based on an asset to be subject to the authentication and/or authorization among the assets related to the control system, and specifies a request level, and a relationship between an asset of a request source and an asset of a request destination. The request (hereinafter, also referred to as an "authentication and authorization request") here means an authentication and/or authorization request at a time when the asset of the request source (hereinafter, also referred to as a "request source asset") requests the asset of the request destination (hereinafter, also referred to as a "request destination asset") to execute predetermined processing. The request level indicates a degree of confirmation required in the authentication and/or authorization in response to the authentication and authorization request. The relationship indicates a relationship between the request source asset and the request destination asset. A specific example of the request content will be described later with reference to FIG. 5.

The asset status extraction unit 104 refers to the asset status data 400 in the asset status storage unit 102 and extracts the asset statuses of the request source asset and the request destination asset for the authentication and authorization request.

The authentication and authorization means storage unit 106 stores authentication and authorization means data 600. The authentication and authorization means data 600 includes an association between asset statuses of the request source asset and the request destination asset, a request level, and a relationship between the request source asset and the request destination asset and a method used to be used for authentication or authorization when the request source asset requests the request destination asset to execute predetermined processing. By referring to the authentication and authorization means data 600 based on the asset statuses of the request source asset and the request destination asset, the request level, and the relationship between the request source asset and the request destination asset, a method to be used for authentication and/or authorization can be learned.

The authentication and authorization means determination unit 105 determines an authentication and/or authorization method in the authentication and authorization means storage unit 106 using the request level and the relationship in the request content analysis unit 103 and the asset statuses of the request source asset and the request destination asset in the asset status extraction unit 104.

Note that each of the above-described storage units and arithmetic units may be a central processing unit (CPU) or a personal computer (PC) itself.

With reference to FIG. 2, the authentication and authorization means determination device 20 includes a processing unit 21 such as a CPU, a memory 22, and an input and output interface (I/F) 23 connected to each other by a bus or the like. Here, the processing unit 21 includes the asset status evaluation unit 101, the request content analysis unit 103, the asset status extraction unit 104, the authentication and authorization means determination unit 105, an asset evaluation value calculation unit 701, an asset evaluation value extraction unit 703, an authentication and authorization means extraction unit 901, and an authentication and authorization means selection unit 902 implemented by executing a software program. That is, in the present embodiment, the software program is developed in the memory 22, and the processing unit 21 executes the software program, thereby implementing the functions of the respective units.

In addition, the authentication and authorization means determination device 20 is connected to a storage device 24 via the input and output I/F 23. The storage device 24 stores the asset status data 400. That is, the storage device 24 functions as the asset status storage unit 102 in FIG. 1. Further, the storage device 24 stores the authentication and authorization means data 600. That is, the storage device 24 functions as the authentication and authorization means storage unit 106 in FIG. 1. Further, the storage device 24 stores asset evaluation value data 800. That is, the storage device 24 functions as the asset evaluation value storage unit 702 in FIG. 7. In the example of FIG. 2, the storage device 24 is disposed outside the authentication and authorization means determination device 20, but may be disposed inside the authentication and authorization means determination device 20.

Note that FIG. 2 is shared by the first to fourth embodiments as described above, and thus includes the configuration of the other embodiments. The asset evaluation value calculation unit 701 and the asset evaluation value extraction unit 703 are used in the second embodiment and may not be used in the present embodiment. In addition, the authentication and authorization means extraction unit 901 and the authentication and authorization means selection unit 902 are used in the third embodiment, and may not be used in the present embodiment.

Further, the authentication and authorization means determination device 20 is connected to various terminal devices 26-1 and 26-2 via the input and output I/F 23. Each of the terminal devices 26-1 and 26-2 is implemented by a computer, and has a function of receiving an input from a user and displaying a processing result of the authentication and authorization means determination device 20. For example, in the third embodiment, the terminal devices 26-1 and 26-2 function as the authentication and authorization means selection unit 902. Further, the terminal device 26-2 is connected to the authentication and authorization means determination device 20 that determines a verification content of security or safety via a network 25. In FIG. 2, the terminal devices 26-1 and 26-2 are disposed outside the authentication and authorization means determination device 20, but may be disposed integrally with the authentication and authorization means determination device 20. That is, a display device and an input and output device may be disposed in the authentication and authorization means determination device 20.

In addition, the authentication and authorization means determination device 20 can also be connected to the Internet 27 to acquire information from the outside. As an example of this, a control system to be authenticated and/or authorized may be connected via the Internet 27, and the authentication and authorization means determination device 20 may receive asset information from the control system.

A method for determining authentication and authorization means according to the present embodiment will be then described specifically.

FIG. 3 is a conceptual diagram of the control system according to the first embodiment. A control system 300 includes, as components, a system user 30, an operation PC 31, a robot management device 32, an external network 33, an external site 34, a robot 35, a robot system 36, and the authentication and authorization means determination device 20. The robot system 36 is, for example, an asset in which the robot 35 and the robot management device 32 are integrated or an asset in which these are regarded as one. Further, the external site 34 is, for example, a factory, a work site, or a plant where the control system 300 is present, or a physically separated factory, work site, or plant.

Each component and the other components are connected as follows.

The operation PC 31 is connected to the robot management device 32. The robot management device 32 is connected to the operation PC 31, the external network 33, the robot 35, and the robot system 36. The external network 33 is connected to the robot management device 32 and the external site 34. The external site 34 is connected to an external network 33. The robot 35 is connected to the robot management device 32. The robot system 36 is connected to the robot management device 32. The authentication and authorization means determination device 20 is connected to the robot management device 32.

In addition, in the present embodiment, the authentication and authorization means determination device 20 exists as a device independent from the other assets and is connected to the other assets. However, the processing unit 21, the memory 22, the input and output I/F 23, and the storage device 24 of the authentication and authorization means determination device 20 may be provided in the operation PC 31, the robot management device 32, the external network 33, the external site 34, the robot 35, and the robot system 36 constituting the control system. Such a case will be described in the fourth embodiment.

Note that the control system illustrated in FIG. 3 is an example, and the present invention is not limited thereto, and the authentication and authorization means determination device 20 similar to the present embodiment can be applied entirely to the control system requiring authentication and/or authorization. Examples of the control system requiring authentication and/or authorization include a sorting system in a distribution warehouse, a large-scale factory automation (FA) system, plant automation (PA) system, and the like in addition to a manufacturing line system illustrated in FIG. 3. However, the present invention is not limited to the control system exemplified.

FIG. 4 illustrates asset status data.

The asset status data 400 includes the properties of the asset statuses of the assets that are organized in accordance with an asset name 410 and three evaluation criteria of authenticity 420, reliability 430, and protectivity 440. The authenticity 420 is an indicator related to determining whether a target asset is appropriate. The reliability 430 is an indicator related to determining whether a target asset is reliable. The reliability 430 includes, as detailed items, security 431, quality 432, and resilience 433. The security 431 is an index indicating a security state of an asset. The quality 432 is an indicator indicating the quality of the asset. The resilience 433 is an indicator indicating asset resilience (resilience and adaptability). The protectivity 440 is an indicator related to determining how protected a target asset is. These indicators are expressed as follows.

Authenticity
Reliability
Protectivity
Security
Quality
Resilience

These six indicators may be collectively expressed as "ARPSQR". However, the organization of the asset status is not limited to a tabular form illustrated in FIG. 4, the ARPSQR indicator, and a combination thereof.

Figure 5:
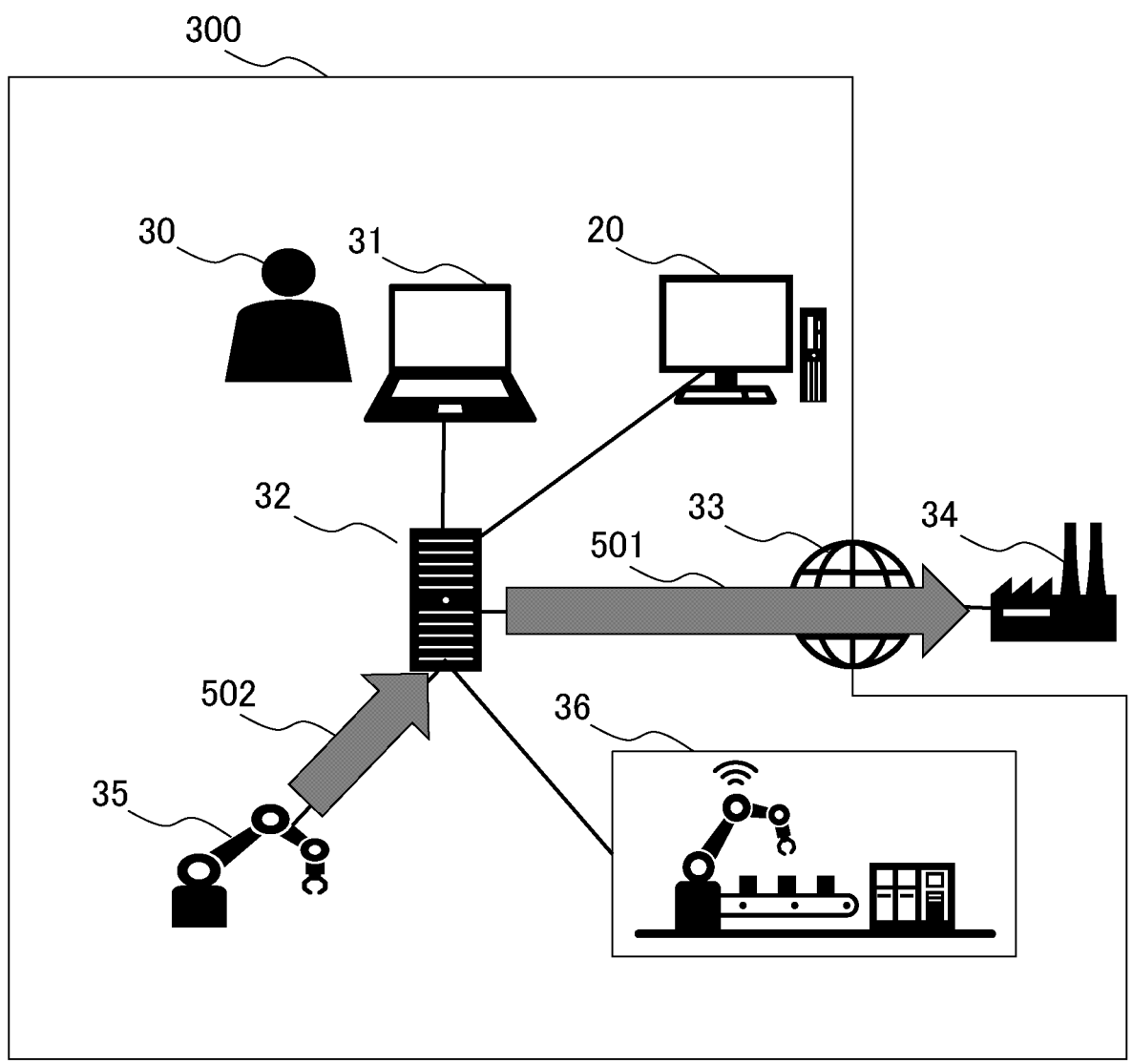
FIG. 5 is a diagram for explaining an example of predetermined processing requested from a request source asset to a request destination asset.

FIG. 5 is a diagram for explaining an example of predetermined processing requested from a request source asset to a request destination asset. FIG. 5 illustrates a request 501 from the robot management device 32 to the external site 34 and a request 502 from the robot 35 to the robot management device 32. The authentication and authorization request illustrated in FIG. 1 cope with these requests for the processing. The request 501 is, for example, a request for starting data communication from the robot management device 32 to the external site 34 because the robot management device 32 preferably uses information about a calculation resource or a database in an external site. The request 502 is, for example, a request to the robot management device 32 to instruct recovery or transmit additional data and a control program necessary for the recovery because the robot 35 is in an abnormal operation or state (status). The contents of the requested processing further include starting of cooperation, establishment of a communication session, and starting of encrypted communication. In the present disclosure, the required processing content or the grading of expression is not particularly limited. The request content analysis unit 103 can cope with a difference in the requested processing content or the grading of or expression. These differences vary depending on a relationship between a target asset and a related task or a request destination asset. The contents of the required processing are not limited to the contents described above. In the following description, the request 501 "a request for starting data communication from the robot management device 32 to the external site 34" is used.

As a result of an analysis of the above-described request 501 "a request for starting data communication from the robot management device 32 to the external site 34" in the request content analysis unit 103, for example, "the request level is medium", and "as for a relationship between the request source asset and the request destination asset, the robot management device 32 and the external site 34 are connected to each other via an external network" are specified. The request level is a standard corresponding to grading of reliability of authentication, that is, a required level of authentication strength. In the authentication and/or authorization, a number of indicators to be used and reliability of a confirmation method to be used are changed depending on the request level. In the present embodiment, a case where the request level is determined in three stages of high, medium, and low will be described as an example. A determination criterion of the request level is a task type and a part related to the task. In the case of the request 502, since the requested processing is data transmission from the robot management device 32 to the robot 35 and is processing relatively close to a normal task, the request level is determined as low. However, the present invention is not limited to the mode in which the request level is determined in three stages. The request level can be determined in a smaller or larger number of stages, or can be expressed by a numerical value. Further, as the relationship between the request source asset and the request destination asset, not only the connection using the network as described above but also a task or a functional connection can be defined.

As for the asset statuses of the request source asset and the request destination asset, in the present embodiment, the request source asset is the robot management device 32, and the request destination asset is the external site 34. The asset status extraction unit 104 extracts information about the robot management device 32 and the external site 34 in the asset status data 400 illustrated in FIG. 4 as the asset statuses of the request source asset and the request destination asset.

The authentication and authorization means determination unit 105 determines authentication and/or authorization means using the above-described "request level: medium", "relationship: the robot management device 32 and the external site 34 are connected via the external network", and "asset statuses of request source asset and request destination asset: asset statuses of the robot management device 32 and the external site 34 in the asset status data 400".

For example, data to be used for determining the authentication and/or authorization means based on the request level, the relationship, and the asset statuses of the request source asset and the request destination asset may be prepared in advance.

Figure 6:
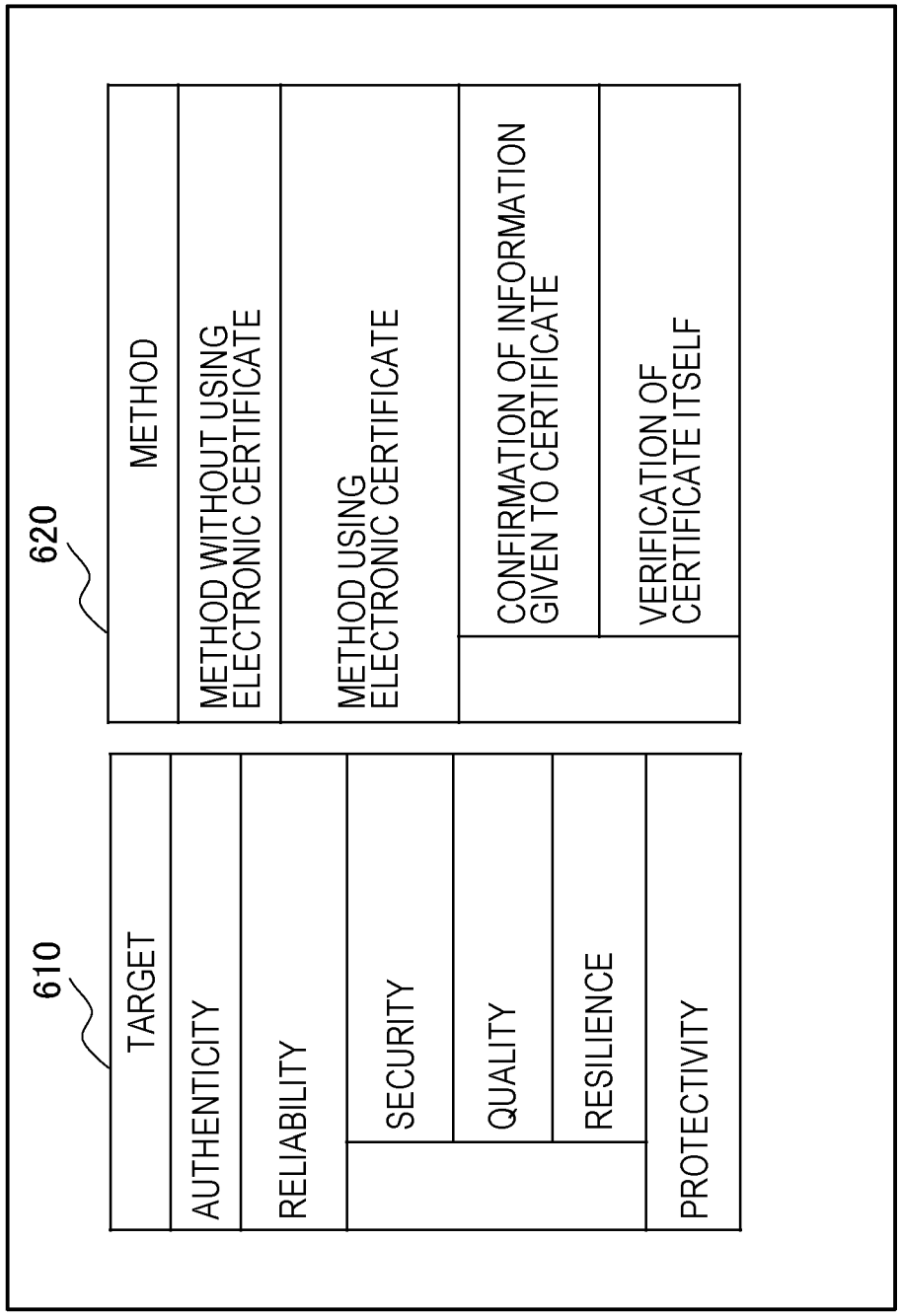
FIG. 6 illustrates an example of authentication and authorization means data.

FIG. 6 illustrates an example of the authentication and authorization means data.

In the authentication and authorization means data 600, a target 610 to be used for authentication and/or authorization and a method 620 to be used for authentication and/or authorization are defined as authentication and authorization means. The authentication and authorization means data 600 is data from which suitable authentication and authorization means can be selected based on the asset statuses of the request source asset and the request destination asset, the request level, and the relationship. For example, the authentication and authorization means data 600 includes associations between the asset statuses of the request source asset and the request destination asset, the request level, the relationship, and the appropriate authentication and authorization means.

As illustrated in FIG. 6, in the present embodiment, ARPSQR that is an organization criterion of the asset status data 400 is used as the target 610 to be used for the authentication and/or authorization, but the present invention is not limited thereto. In addition, examples of the authentication and/or authorization method 620 include three methods of "a method without using an electronic certificate", "a method for confirming information given in a certificate with a method using an electronic certificate", and 37 a method for verifying the certificate itself with the method using an electronic certificate. Here, the authentication and/or authorization method 620 is classified in accordance with whether to use an electronic certificate, but the present invention is not limited thereto. As the authentication and/or authorization method 620, for example, a human may make a visual confirmation, or the verification is not performed in the first place.

In the present embodiment, it is assumed that in the authentication and authorization means determination unit 105, a target "authenticity and reliability: quality" and a method "method for verifying the certificate itself with a method using an electronic certificate" are selected as the authentication and authorization means. In this example, the above-described authentication and authorization means is determined based on the request level being medium and an external network being used between the request source asset and the request destination asset. Further, as another example, in a case where the request source asset or the request destination asset is the robot 35 and the resilience of the asset status of the robot 35 has no redundant calculating capacity, it is difficult to perform authentication and/or authorization with the method using a certificate. In that case, for example, it is conceivable that authentication and authorization means to be used for performing authentication and/or authorization on a target "authenticity only" with the "method without using an electronic certificate" is selected.

In the above embodiment, the authentication and authorization means is determined based on any one or some elements among the request level, the relationship between the request source asset and the request destination asset, and the asset statuses of the request source asset and the request destination asset. However, the authentication and authorization means can be determined in consideration of all of these three elements. In addition, depending on the task type and the task content, the importance of each element with respect to the determination of the authentication and authorization means may be set, and a determination algorithm in which the importance is also taken into consideration by weighting or the like may be adopted.

Note that the present embodiment describes an example in which the authentication and authorization means is expressed by two types of means including a target and a method, and is determined by selecting each of the means. However, the authentication and authorization means may be determined by selecting either a target or a method. In addition, the content of the authentication and authorization means is not limited to the expression using a target and a method. Further, the authentication and authorization means may not be expressed in a tabular form as illustrated in FIG. 6. Further, in the present embodiment, the contents of the table of the target 610 and the table of the method 620 included in the authentication and authorization means are not contents reflecting the configuration and the like of the target control system but are general expressions. However, the authentication and authorization means may be expressed by a specific device name and a network name in consideration of the configuration and the like of the target control system.

As described above, according to the present embodiment, the authentication and authorization means determination device 20 acquires an authentication and authorization request for requesting authentication and/or authorization when the request source asset requests the request destination asset to execute predetermined processing, analyzes the authentication and authorization request to specify at least one element among the asset statuses indicating target matters of the authentication and/or authorization for the request source asset and the request destination asset, the request level indicating a degree of confirmation required for the authentication and/or authorization in response to the authentication and authorization request, and the relationship between the request source asset and the request destination asset, and determines authentication and authorization means to be used for the authentication and/or authorization in response to the authentication and authorization request, based on the at least one specified element. As described above, the authentication and authorization means is determined based on at least one of the asset statuses, the request level, and the relationship obtained by analyzing the authentication and authorization request related to the processing request between the assets of the target system. Thus, the authentication and/or authorization can be achieved suitably for each asset in the target system having various assets. The authentication and authorization means that meets the requirements specific to the control system can be determined by using the characteristics and statuses of the assets to be subject to authentication and/or authorization, and the request level such as the required security and the required degree of reliability.

Second Embodiment

Hereinafter, a second embodiment will be described with reference to the drawings.

In the first embodiment, the asset statuses expressed by a plurality of evaluation criteria as illustrated in FIG. 4 are used for determining the authentication and authorization means. However, some of assets have a less amount of information indicating properties, and such information is difficult to use as information for determining the authentication and authorization means in the first place. Therefore, in the present embodiment, in order to make it clearer how each piece of information about the assets has contributed to the determination of the authentication and authorization means, an evaluation value is assigned to each asset based on the asset status in which the asset information about each asset is organized, and each evaluation value is used for determining the authentication and authorization means. This makes it clearer how the asset information has contributed to the determination of the authentication and authorization means.

Figure 7:
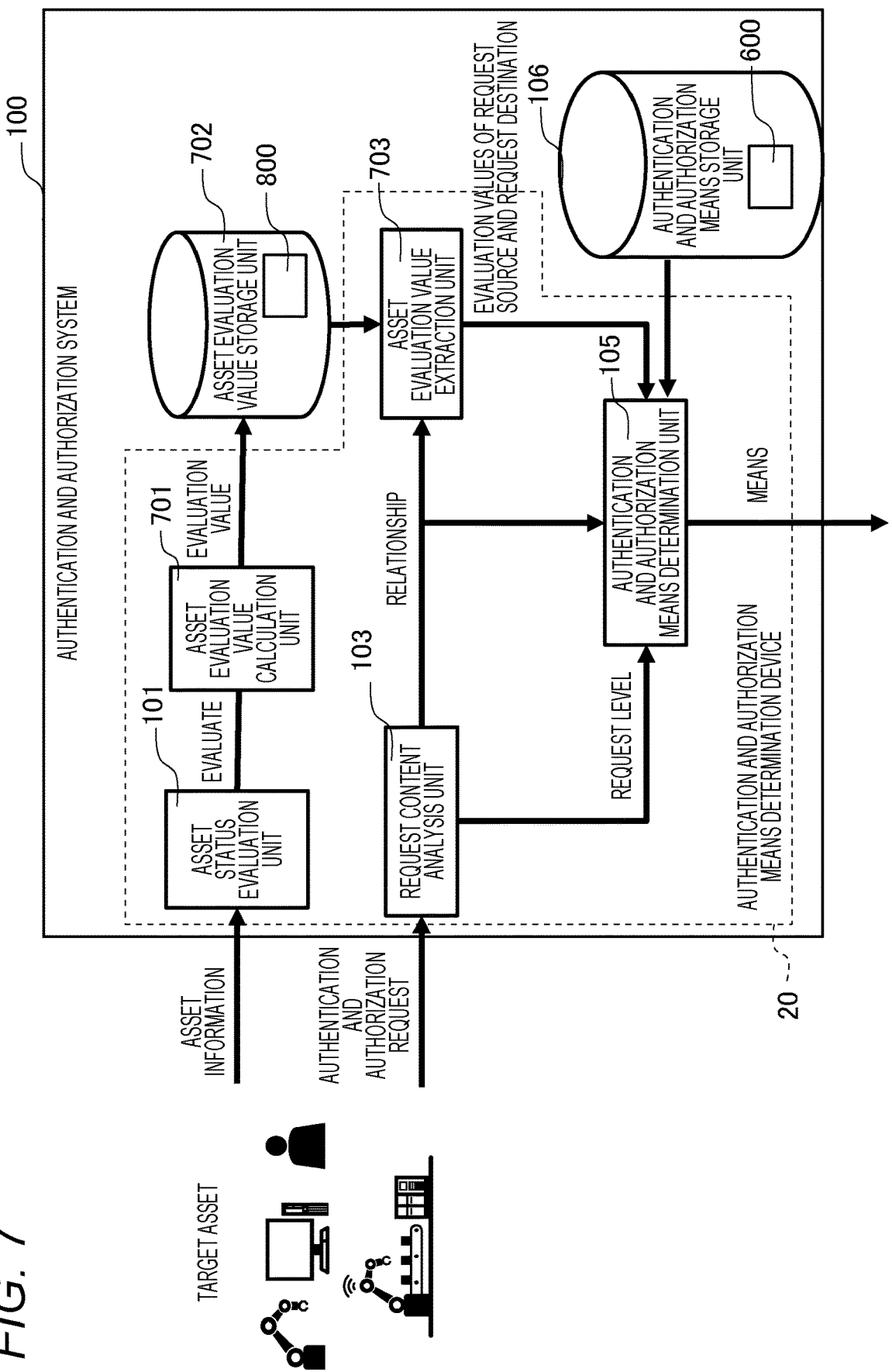
FIG. 7 is a block diagram of an authentication and authorization system according to a second embodiment.

FIG. 7 is a block diagram of an authentication and authorization system according to the second embodiment.

In the present embodiment, an asset evaluation value calculation unit 701 is added to the authentication and authorization means determination device 20 of the first embodiment illustrated in FIG. 1, the asset status storage unit 102 is replaced by an asset evaluation value storage unit 702, and the asset status extraction unit 104 is replaced by an asset evaluation value extraction unit 703. In FIG. 7, the units indicated by reference numerals 101, 103, 105, and 106 are identical to the units in FIG. 1. The asset evaluation value calculation unit 701 and the asset evaluation value extraction unit 703 are disposed in the authentication and authorization means determination device 20 illustrated in FIG. 2 shared in the first to fourth embodiments. Further, in the block diagram of FIG. 2, the storage device 24 includes the asset evaluation value storage unit 702.

The asset evaluation value calculation unit 701 calculates and assigns an evaluation value to each asset by using the asset status of each asset in the asset status data 400 of FIG. 4 evaluated by the asset status evaluation unit 101.

FIG. 8 illustrates an example of asset evaluation value data. The asset evaluation value data 800 includes an asset name 810 of each asset and an evaluation value 820 of each asset in association with each other. Here, an example in which evaluation values are assigned to the robot 35, the robot management device 32, and the external site 34 in the asset status data 400 of FIG. 4 is illustrated. In the present embodiment, as a method for calculating the evaluation values, the number of "available" in the asset status data 400 is used as the evaluation values. It can be interpreted that the higher the evaluation value, the more information the asset has, and thus the asset is more reliable. However, the method for calculating the evaluation values in the asset evaluation value calculation unit 701 is not limited to the above method, and the evaluation values may be calculated by assigning a weight to each evaluation criterion of the ARP-SQR in the asset status data 400. In addition, the evaluation may be tilted. Further, evaluation values may be calculated for respective evaluation criteria, and the obtained values may be simply summed. Alternatively, a multiplied value or a difference may be used. In addition, a representative value such as an average value, a median value, a geometric mean, or a logarithmic mean of the evaluation values for the respective evaluation criteria may be used.

Next, an example of determination of the authentication and authorization means using the above-described evaluation values will be described.

As the content of the requested processing, the request 501 "a request for starting data communication from the robot management device 32 to the external site 34" is used as in the first embodiment. Therefore, "the request level is medium" and "as for the relationship between the request source asset and the request destination asset, the robot management device 32 and the external site 34 are connected via an external network". As the evaluation values of the request source asset and the request destination asset in FIG. 7, the evaluation value of the robot management device 32 is 7, and the evaluation value of the external site 34 is 1. In the present embodiment, the robot management device 32 and the external site 34 are connected via the external network and the gap (difference) between the evaluation values of the request source asset and the request destination asset is 6. Therefore, for example, it is assumed that the target "authenticity and reliability: quality" and "the method for verifying the certificate itself with the method using an electronic certificate" are selected as the authentication and authorization means. In the present embodiment, the higher the evaluation value of an asset, the higher the evaluation is. Thus, the larger the gap in reputation values, the more secure the targets and methods need to be. However, this is an example, and depending on the method for calculating an evaluation value, it may be unnecessary to select the more secure authentication and authorization means as the gap is larger.

In the present embodiment, the authentication and authorization means is determined based on the relationship between the request source asset and the request destination asset and the evaluation values of the request source asset and the request destination asset. However, manual authentication and authorization means can be determined in consideration of all of the three elements obtained by adding the request level to the above two elements. Further, depending on a task type and a task content, the importance of the element with respect to the determination can be set and a determination is made by assigning a weight for the like to the importance.

As described above, according to the method for determining the authentication and authorization means of the present embodiment, the authentication and authorization means can be determined while how the asset information has contributed to the determination of the authentication and authorization means is clarified.

Third Embodiment

Hereinafter, a third embodiment will be described with reference to the drawings.

A case is considered such that a user of the control system desires to select the authentication and authorization means. In the present embodiment, rather than the authentication and authorization system 100 uniquely determining the authentication and authorization means, the authentication and authorization system 100 presents the authentication and authorization means that meets conditions to a user and enables selection by the user.

Figure 9:
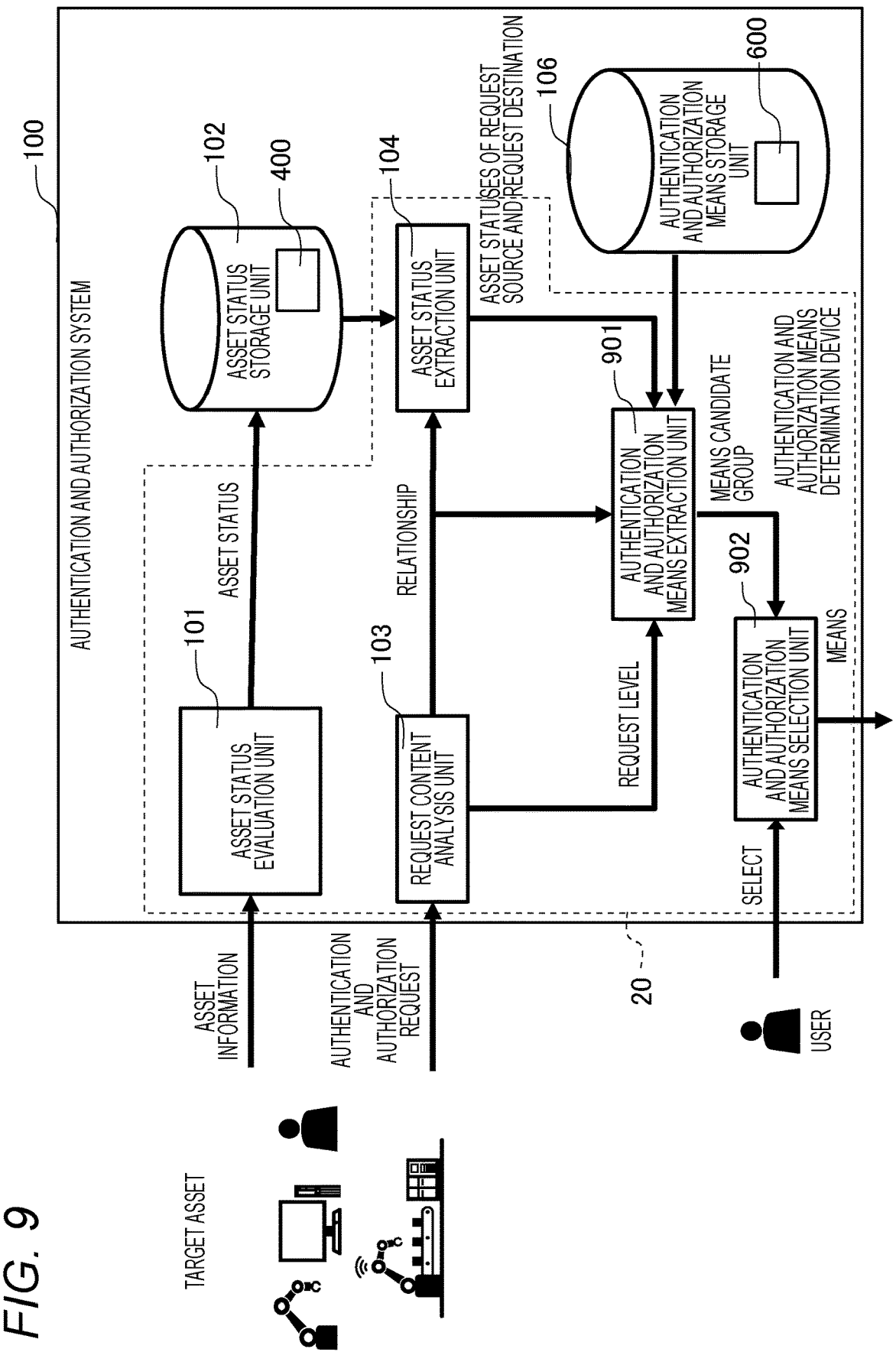
FIG. 9 is a block diagram of an authentication and authorization system according to a third embodiment.

FIG. 9 is a block diagram of an authentication and authorization system according to the third embodiment.

In the present embodiment, the authentication and authorization means determination unit 105 is replaced by an authentication and authorization means extraction unit 901, and an authentication and authorization means selection unit 902 is added to the authentication and authorization means determination device 20 of the first embodiment illustrated in FIG. 1. In FIG. 9, the units indicated by reference numerals 101 to 104, and 106 are identical to the units in FIG. 1. The authentication and authorization means extraction unit 901 and the authentication and authorization means selection unit 902 are disposed in the authentication and authorization means determination device 20 in FIG. 2 shared in the first to fourth embodiments.

Using one or more of the request level, the relationship between the request source asset and the request destination asset, and the asset statuses of the request source asset and the request destination asset, the authentication and authorization means extraction unit 901 sets a minimum condition and a maximum condition for the authentication and/or authorization request, and extracts the authentication and authorization means within the range between these conditions from the authentication and authorization means storage unit 106 as candidates. In the present embodiment, it is assumed that the minimum condition is set to "having authenticity for a target" and the maximum condition is set to "the number of targets is two, and the method is the method for confirming information given to a certificate with the method using an electronic certificate".

Figure 10:
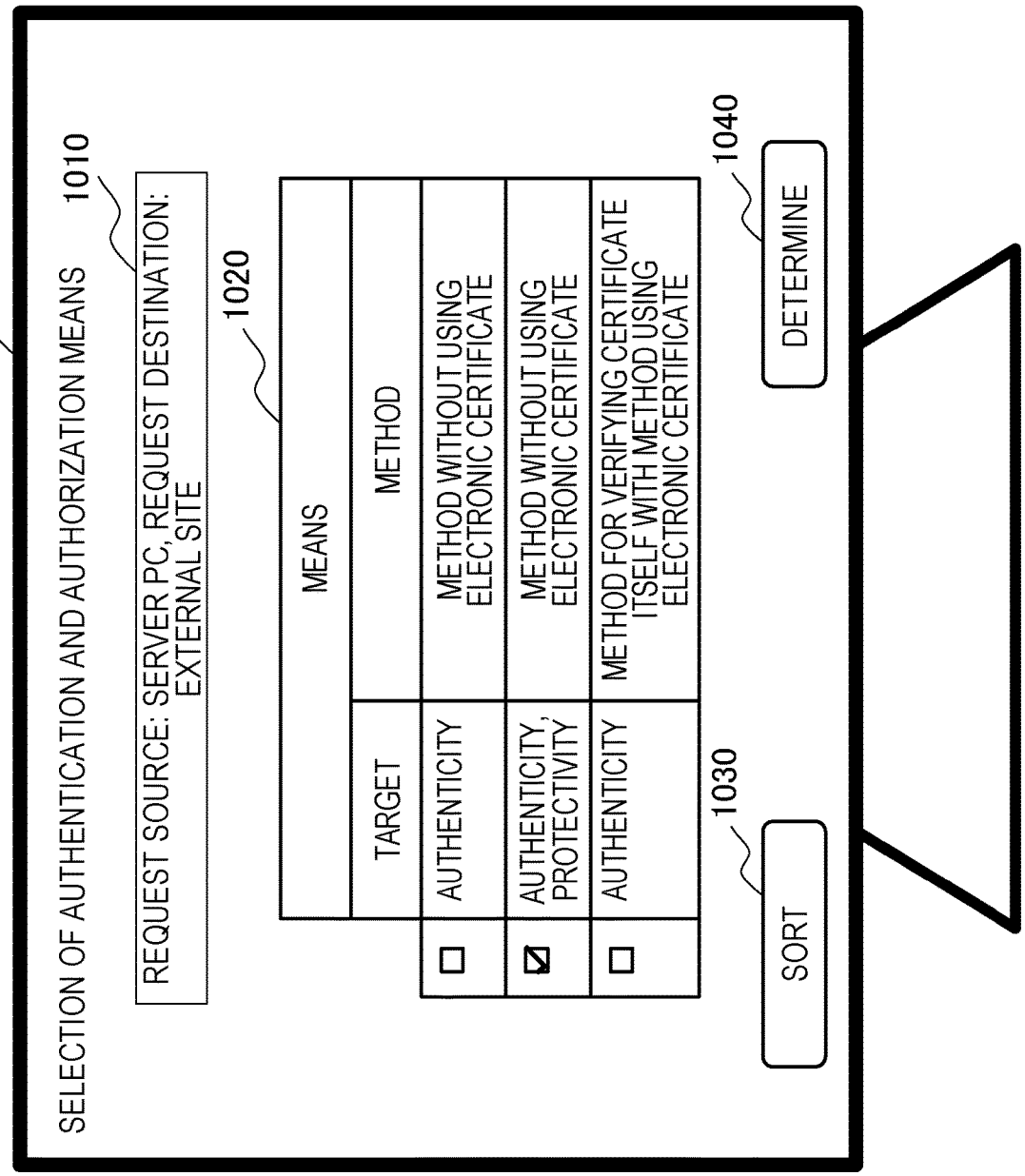
FIG. 10 illustrates a screen image during an operation of an authentication and authorization means selection unit.

FIG. 10 illustrates a screen image during an operation of the authentication and authorization means selection unit.

A screen image 1000 is achieved by using the terminal devices 26-1 and 26-2 illustrated in FIG. 2. Display 1010 included in the screen image 1000 shows the names of the request source asset and the request destination asset of the current processing request. A table 1020 shows candidates of authentication and authorization means to be used for authentication and/or authorization for the current requested processing. The user selects any authentication and authorization means on a check box in the table 1020. A button 1030 is a button for sorting the contents of the table 1020. A determination button 1040 is a button for finally determining the authentication and authorization means selected by the user in the table 1020. In FIG. 10, the target is set to "authenticity and reliability", a checkbox of "the method without using an electronic certificate" is selected, and the determination button 1040 is clicked to determine the authentication and authorization means.

As described above, the method for determining the authentication authorization means of the present embodiment can help the user determine the authentication authorization means by presenting selection candidates to the user and prompting the selection.

Fourth Embodiment

Hereinafter, the fourth embodiment will be described with reference to the drawings.

In the first to third embodiments, the determination of the authentication and authorization means is performed on the authentication and authorization means determination device 20 independently disposed on the control system (hereinafter referred to as "centralized type"). However, some of the functions of the authentication and authorization means determination device 20 can be distributed and disposed in other assets (hereinafter referred to as "distributed type"). In the distributed type, the authentication and authorization means can be determined without depending on the independent authentication and authorization means determination device thus reducing the time for communication between the authentication and authorization means determination device and other assets.

The fourth embodiment describes an example in which the authentication and authorization means determination device 20 is configured as a distributed system (hereinafter, also referred to as an "authentication and authorization means determination system").

Figure 11:
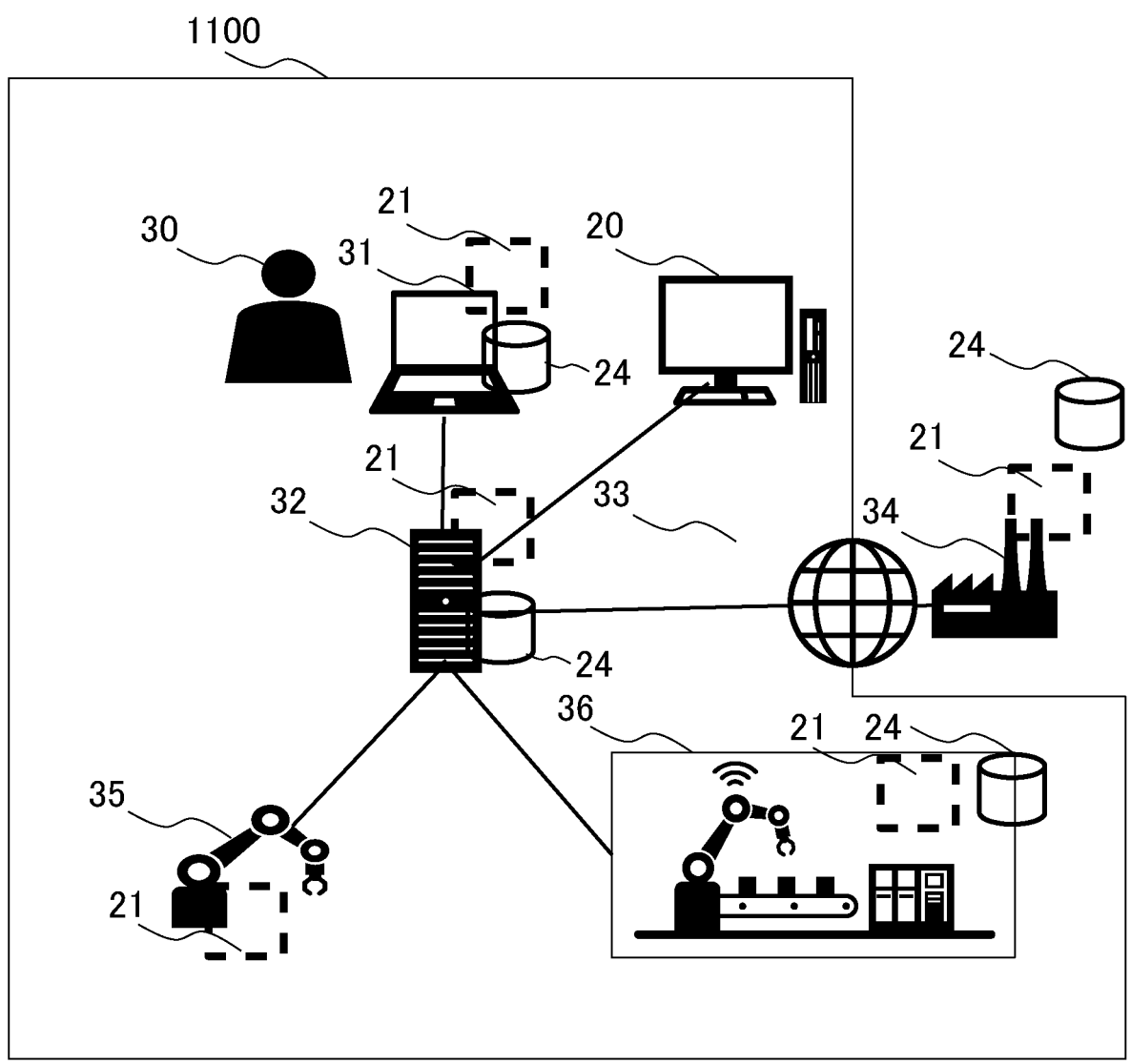
FIG. 11 is a conceptual diagram of a control system according to a fourth embodiment.

FIG. 11 is a conceptual diagram of the control system according to the fourth embodiment.

FIG. 11 illustrates an example of a control system 1100 including the distributed authentication and authorization means determination system. In the control system 1100, the processing unit 21 and/or the storage device 24 of the authentication and authorization means determination device 20 are disposed in each asset. An asset, such as the robot 35, that cannot include the storage device 24 due to hardware constraints may instead include the storage device 24 of the robot 35 in an associated device such as the robot management device 32. The contents of the data and the like held in the storage device 24 of each asset may be delivered and updated by the authentication and authorization means determination device functioning as a central management device. The update frequency may be set or changed to an appropriate frequency in accordance with a task and characteristics of the control system itself. In the present embodiment, since the processing unit 21 and the storage device 24 of the authentication and authorization means determination device are distributed, the authentication and authorization means is determined by the processing unit 21 and the storage device 24 disposed in the request source asset or the request destination asset. A specific procedure of determining the authentication and authorization means and example thereof are similar to those in the above-described first to third embodiments.

As described above, the configuration and the method for determining the authentication and authorization means of the present embodiment enables the determination of the authentication and authorization means without depending on the authentication and authorization means determination device 20.

The first to fourth embodiments of the present invention has been described above. The present invention is not limited to the above-described embodiments, and includes various modifications. The above embodiments have been described in detail in order to comprehensively describe the present invention. Therefore, for example, the contents of the information stored in the storage unit, the analysis processing in the request content analysis unit 103, the processing in the authentication and authorization means determination unit 105, the authentication and authorization means extraction unit 901, and the authentication and authorization means selection unit 902, the output results, and the like are not necessarily limited to all the configurations, processing, information, and numerical values described above.

Further, a part or all of the above-described configurations, functions, processing units, processing means, and the like may be implemented by hardware, such as designing on an integrated circuit. Further, each of the above-described configurations, functions, and the like may be implemented by software in such a manner that programs implementing the functions are interpreted and executed. Information such as programs, tables, and files for implementing the functions can be stored in a storage device such as a memory, a hard disk, and a solid state drive (SSD), or in a recording medium such as an integrated circuit (IC) card, a secure digital (SD) card, and a digital versatile disc (DVD).

What is claimed is:

1. An authentication and authorization system that determines authentication and authorization to be used for performing authentication and/or authorization on an asset associated with a target system, which is an industrial control system, the authentication and authorization system comprising:
   a storage device that stores management data and a software program; and
   a processor that, upon executing the software program using the management data, configures the processor to:
   acquire an authentication and authorization request for requesting the authentication and/or authorization when a request source asset requests a request destination asset to execute predetermined processing,
   analyze the authentication and authorization request to specify at least one of asset statuses indicating target matters of the authentication and/or authorization for the request source asset and the request destination asset, a request level indicating a degree of confirmation required for the authentication and/or authorization in response to the authentication and authorization request, and a relationship between the request source asset and the request destination asset, and
   determine the authentication and authorization to be used for the authentication and/or authorization in response to the authentication and authorization request, based on the specified at least one of the asset statuses, the request level, and the relationship,
   wherein the management data includes asset status data including the asset statuses of the assets, and
   wherein the processor is configured to analyze the authentication and authorization request to learn the request source asset and the request destination asset, and refers to the asset status data to specify the asset statuses of the request source asset and the request destination asset,
   wherein the management data further includes authentication and authorization data that enables extraction of the authentication and authorization to be used for the authentication and/or authorization between the request source asset and the request destination asset, based on the asset statuses of the request source asset and the request destination asset, the request level, and the relationship between the request source asset and the request destination asset, and
   wherein the processor is configured to determine the authentication and authorization to be used for the authentication and/or authorization in response to the authentication and authorization request with reference to the authentication and authorization data, based on the specified at least one of the asset statuses, the request level, and the relationship.

2. The authentication and authorization system according to claim 1,
   wherein the asset statuses are expressed by properties based on a plurality of evaluation criteria related to the authentication and/or authorization of the assets, and
   wherein the processor is configured to acquire information regarding each asset included in the target system in advance, specifies the properties based on the evaluation criteria of the assets based on the information, and record the properties in the asset status data as the asset statuses of the assets.

3. The authentication and authorization system according to claim 2, wherein the evaluation criteria include authenticity of an asset, reliability including security, quality, and resilience, and protectivity.

4. The authentication and authorization system according to claim 1,
wherein the asset statuses are expressed by evaluation values that are numerical values calculated based on properties based on a plurality of evaluation criteria regarding the authentication and/or authorization of the assets, and
wherein the authentication and authorization data enables extraction of the authentication and authorization to be used for the authentication and/or authorization between the request source asset and the request destination asset, based on the evaluation values of the asset statuses of the request source asset and the request destination asset, the request level, and the relationship between the request source asset and the request destination asset.

5. The authentication and authorization system according to claim 1,
wherein the authentication and authorization data enables extraction of one or more authentication and authorization to be used for the authentication and/or authorization between the request source asset and the request destination asset based on the asset statuses of the request source asset and the request destination asset, the request level, and the relationship between the request source asset and the request destination asset, and
wherein the processor is configured to extract one or more authentication and authorization with reference to the authentication and authorization data based on the specified at least one of the asset statuses, the request level, and the relationship, and present the extracted one or more authentication and authorization to a user as a selection candidate to prompt the user to select any authentication and authorization.

6. The authentication and authorization system according to claim 1,
wherein each of the assets includes the processor, and
wherein the processor disposed in an asset serving as a request source asset or an asset serving as a request destination asset, is configured to:
analyze the authentication and authorization request to specify at least one of the asset statuses of the request source asset and the request destination asset, the request level, and the relationship between the request source asset and the request destination asset, and
determine the authentication and authorization based on the specified at least one of the asset statuses, the request level, and the relationship.

7. An authentication and authorization determination method for determining authentication and authorization to be used for performing authentication and/or authorization on an asset associated with a target system, which is an industrial control system, the method causing a computer to perform steps comprising:
acquiring an authentication and authorization request for requesting the authentication and/or authorization when a request source asset requests a request destination asset to execute predetermined processing;
analyzing the authentication and authorization request to specify at least one of asset statuses indicating target matters of the authentication and/or authorization for the request source asset and the request destination asset, a request level indicating a degree of confirmation required for the authentication and/or authorization in response to the authentication and authorization request, and a relationship between the request source asset and the request destination asset; and
determining the authentication and authorization to be used for the authentication and/or authorization in response to the authentication and authorization request, based on the specified at least one of the asset statuses, the request level, and the relationship,
wherein the management data includes asset status data including the asset statuses of the assets, and
wherein the method further comprises analyzing the authentication and authorization request to learn the request source asset and the request destination asset, and refers to the asset status data to specify the asset statuses of the request source asset and the request destination asset,
wherein the management data further includes authentication and authorization data that enables extraction of the authentication and authorization to be used for the authentication and/or authorization between the request source asset and the request destination asset, based on the asset statuses of the request source asset and the request destination asset, the request level, and the relationship between the request source asset and the request destination asset, and
wherein the method further comprises determining the authentication and authorization to be used for the authentication and/or authorization in response to the authentication and authorization request with reference to the authentication and authorization data, based on the specified at least one of the asset statuses, the request level, and the relationship.

8. A non-transitory computer readable medium storing an authentication and authorization determination program that determines authentication and authorization to be used for performing authentication and/or authorization on an asset associated with a target system, which is an industrial control system, the program causing a computer to perform steps comprising:
acquiring an authentication and authorization request for requesting the authentication and/or authorization when a request source asset requests a request destination asset to execute predetermined processing;
analyzing the authentication and authorization request to specify at least one of asset statuses indicating target matters of the authentication and/or authorization for the request source asset and the request destination asset, a request level indicating a degree of confirmation required for the authentication and/or authorization in response to the authentication and authorization request, and a relationship between the request source asset and the request destination asset; and
determining the authentication and authorization to be used for the authentication and/or authorization in response to the authentication and authorization request, based on the specified at least one of the asset statuses, the request level, and the relationship,
wherein the management data includes asset status data including the asset statuses of the assets, and
wherein the steps further comprise analyzing the authentication and authorization request to learn the request source asset and the request destination asset, and refers to the asset status data to specify the asset statuses of the request source asset and the request destination asset, wherein the management data further includes authentication and authorization data that enables extraction of the authentication and authorization to be used for the authentication and/or authorization between the request source asset and the request destination asset, based on the asset statuses of the request source asset and the request destination asset, the request level, and the relationship between the request source asset and the request destination asset, and wherein the steps further comprise determining the authentication and authorization to be used for the authentication and/or authorization in response to the authentication and authorization request with reference to the authentication and authorization data, based on the specified at least one of the asset statuses, the request level, and the relationship.

* * * * *